(No Model.) 2 Sheets—Sheet 2.
H. J. GOULDBERG.
RUNNING GEAR FOR WAGONS.
No. 444,827. Patented Jan. 20, 1891.
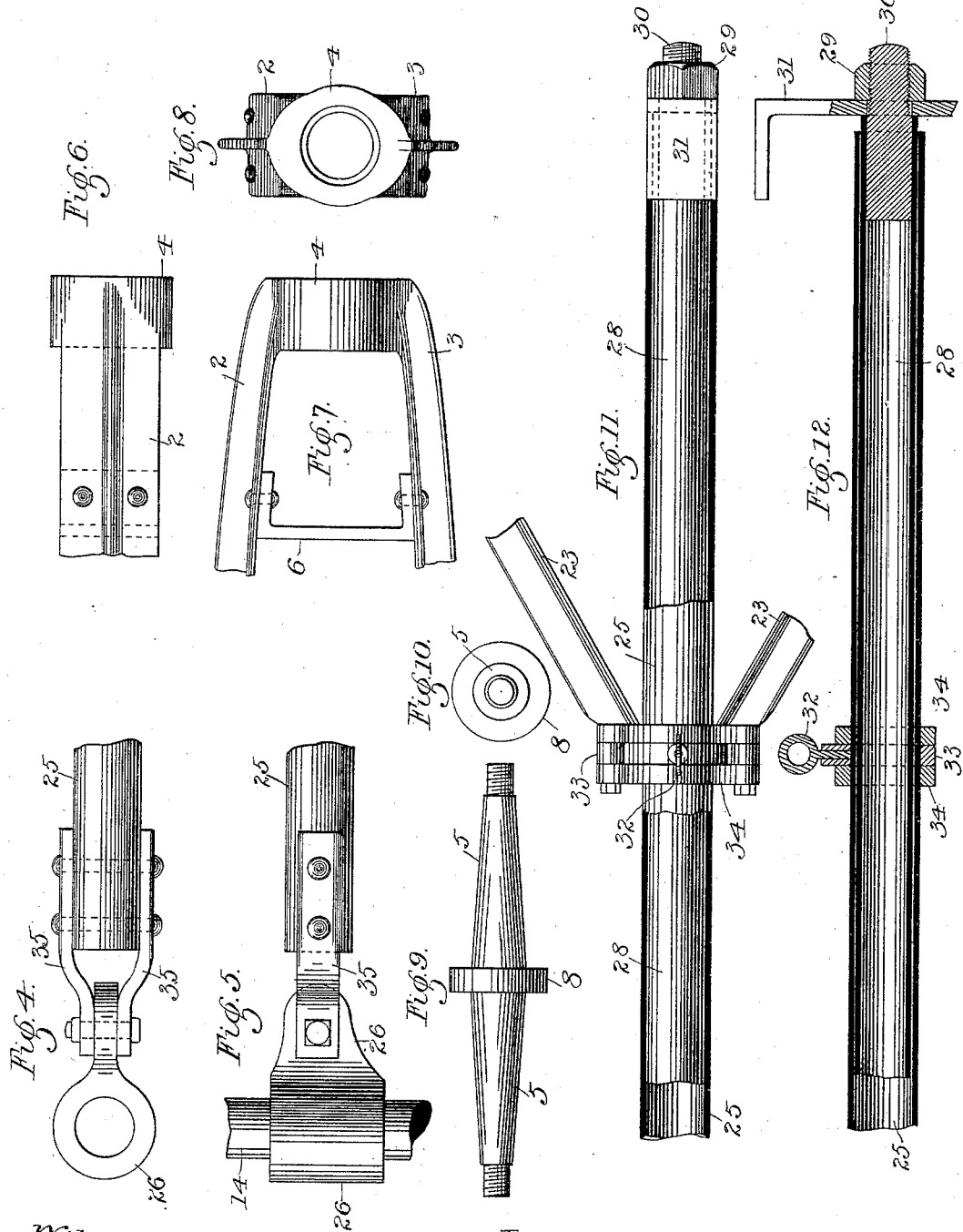
Witnesses:—
A. Mar Welch.
C. L. Caldwell.
Inventor:—
Hans. J. Gouldberg,
per Paul Merwin
Attorneys.

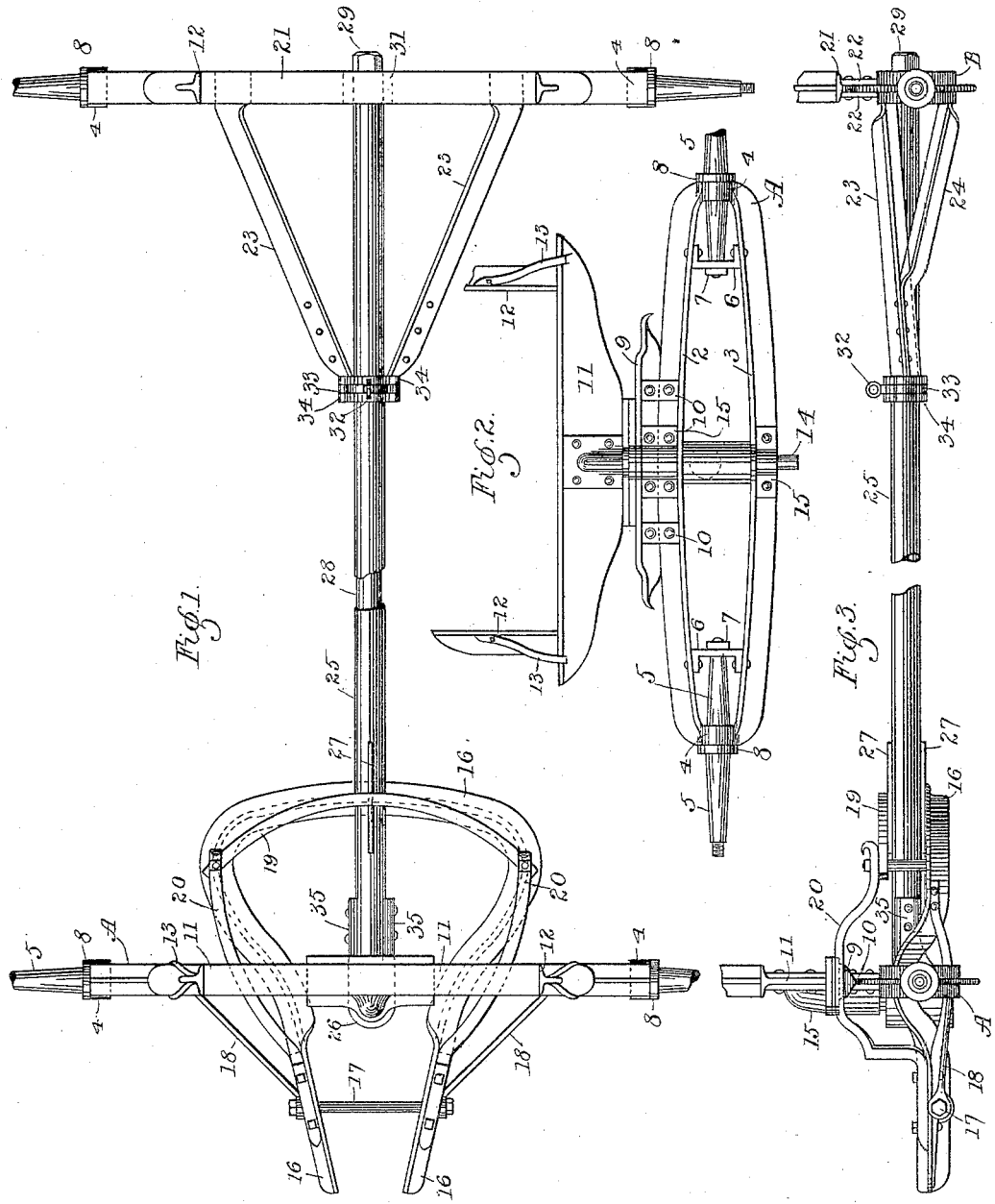

UNITED STATES PATENT OFFICE.

HANS J. GOULDBERG, OF CAMBRIDGE, MINNESOTA.

RUNNING-GEAR FOR WAGONS.

SPECIFICATION forming part of Letters Patent No. 444,827, dated January 20, 1891.

Application filed October 17, 1890. Serial No. 368,436. (No model.)

*To all whom it may concern:*

Be it known that I, HANS J. GOULDBERG, of Cambridge, Isanti county, Minnesota, have invented certain Improvements in Running-Gear for Wagons, of which the following is a specification.

My invention relates to improvements in the running-gear of ordinary farm-wagons and similar vehicles, its object being to provide a gear which shall combine with great strength and durability comparatively light weight, simplicity of construction, and low cost; and it consists in employing almost exclusively in its construction I T and similar types of bar-steel to secure the greatest strength with the least weight; in forming the axles of two steel bars in elliptical form; in connecting the axles together by means of a tubular telescoping reach, and in removably securing in the ends of the axles reversible spindles, upon which the wheels are fitted and turn in the ordinary manner.

My invention further consists in the construction and combination hereinafter described, and particularly pointed out in the claims.

In the accompanying drawings, forming part of the specification, Figure 1 is a plan view of my improved running-gear, showing the arrangement and connections of the various parts. Fig. 2 is a front end elevation of the same. Fig. 3 is a side elevation of the same. Figs. 4 and 5 are respectively a detail plan view and side elevation of the connection between the reach and forward axle. Figs. 6, 7, and 8 are respectively detail plan, side, and end elevations of the end of an axle. Figs. 9 and 10 are respectively side and end views of the reversible spindle, and Figs. 11 and 12 are sectional details of the reach.

In the drawings, A represents the forward axle, and B the rear axle, both similarly formed and made up of the upper and lower members 2 and 3 of T-steel bars elliptically curved and rigidly secured together at the ends by means of the block 4 welded between. These blocks 4 are bored out in line with the axis of the axle to receive one end of the double spindle or axle-arm 5, a cross-bar or standard 6 being secured between the members 2 and 3 of the axle and provided with a central screw-threaded opening in line with the openings through the block 4 and into which is screwed the inner end of the spindle 5, a lock-nut 7 being preferably screwed upon the inwardly-projecting threaded end of the spindle and bearing against the cross-bar 6 to firmly secure the spindle in the axle, the collar 8 of the spindle bearing against the outer face of the block 4. The outwardly-projecting end of the spindle enters the hub-box of the wheel and is secured therein in the ordinary manner.

Secured upon the top of the forward axle A is the head-block 9, formed also of T-steel and preferably secured to the bar 2 by means of straps 10, riveted or bolted to both the bar and head-block. Supported upon the head-block is the bolster 11, formed of I-steel, with each end cut tapering on the under side, as shown. At each end of the bolster is arranged the standard 12, formed of T-steel and provided with suitable braces 13. The king-bolt 14 is secured to the bolster and axle by means of the loops 15, riveted to the respective parts and serving as bearing-boxes for the bolt.

The lower member 16 of the fifth-wheel is formed of T-steel, the ends of which are carried forward between the upper and lower members of the axle, to which they are rigidly secured. Through the ends of the bar 16 is passed the bolt 17, which serves as a pivotal support for the wagon-pole in the ordinary manner, suitable braces 18 connecting the ends of the bar with the ends of the axles. The upper member 19 of the fifth-wheel may be made of flat bar-steel or any other preferred form and connected by the bars 20 with the head-block 9, over which they are passed and rigidly secured to the ends of the lower member 16 in front of the axle.

The bolster 21 of the hind axle B is formed of T-steel, rigidly secured to the upper member of the axle by means of the straps or bars 22, riveted thereto. The reach-braces 23 and 25 are rigidly secured, respectively, to the upper and lower members of the axle, with their forward ends riveted together on each side of the reach. This reach I prefer to construct of steel pipe, one member 25 of which is pivotally connected to the forward axle by means of the loop or eye 26, through which the king-bolt passes, and which is pivotally secured between the straps 35, rigidly secured to opposite sides of the reach, whereby vertical and lateral pivotal movement are permitted between the reach and forward axle, thus constituting a universal joint between them. Suitable bearing-plates 27 are riveted upon the upper and lower sides of the reach and bear against the upper and lower members of the fifth-wheel, thus preventing wear upon the reach itself. The inner or rear member 28 of the reach is rigidly secured at one end to the rear axle by means of a nut 29, threaded upon a bolt 30, fixed in the end of the tube and projecting through a cross bar or block 31, secured between the two members of the axle, the tube 28 being arranged within the other tube 25, whereby the distance between the two axles may be varied by simply sliding the tubes upon each other.

In order to hold the reach at any desired adjusted length, I arrange a set-screw 32, threaded into a bearing-block 33, which is held in a slot in the collar 34, secured between the ends of the opposite braces 23 and 24, and through which the tube 25 passes, the block having freedom of circumferential movement in the collar. It will thus be seen that when the set-screw is secured upon the tube the tube is prevented from moving longitudinally through the collar; but it is allowed to turn partially in it by means of the arrangement of the block 33 in the collar, and thus a slight rocking or turning movement of one member of the reach upon the other is allowed to accommodate the wagon to the inequalities of surface over which the wheels pass without straining the parts.

I claim—

1. In a wagon, the combination, with the axles thereof, of reversible spindles adapted to be secured thereto by screwing one of the tips of the spindle into a threaded opening in said axle, whereby the spindle is held rigidly in place and adapted to carry a wheel upon its outer end, substantially as and for the purposes set forth.

2. In a wagon, the combination, with the axle formed of two elliptically-curved members, of blocks rigidly secured between their meeting ends, having openings therethrough registering with each other, cross-bars between said axle members, having screw-threaded openings registering with the openings in said blocks, and double or reversible spindles removably arranged in the openings in said blocks and with their threaded tips screwed into the openings in said cross-bars, substantially as described.

3. In a wagon, the combination of the curved axle members 2 and 3, the blocks 4, secured between their adjacent ends, having openings therethrough in line with the axis of the axle, standards 6, secured between the members 2 and 3 and having screw-threaded openings in line with said axis, reversible spindles 5, removably inserted in the openings in said blocks with their tips screwed into said standards, and set-nuts 7, screwed upon the tips projecting through the standard 6, substantially as described.

4. In a wagon, the combination, with the axle thereof, of a tubular metallic reach composed of telescoping members, the outer member having universal-joint connection with the forward axle and the inner member being rigidly secured to the rear axle and extending forward within the outer member, braces extending forward from the rear axle to said reach, a collar uniting the forward ends of said braces and surrounding the outer member of said reach, and a set-screw carried by said collar and engaging said outer member, substantially as and for the purposes set forth.

5. In a wagon, the combination, with its axles, of a telescoping tubular reach, the outer member being connected by a universal joint to the forward axle and the inner member rigidly connected to the rear axle, braces from said rear axle to said reach, a collar connecting said braces and surrounding said reach, a block carried by said collar and having freedom of circumferential movement, and a set-screw threaded in said block and bearing upon the outer member of said reach, substantially as described.

6. A metallic wagon running-gear comprising, in combination, a skeleton or frame made up of flanged or ribbed bars, a tubular telescoping reach, and reversible spindles rigidly but removably secured to the axles, substantially as and for the purposes set forth.

7. A wagon-axle comprising, in combination, a pair of oppositely-arched or elliptically-curved T-steel bars, with the cross-web of the bar forming the inner concave side, blocks rigidly connecting the adjacent ends of the bars, axle-openings therethrough, fixed cross-bars between the axle members, having axial threaded openings therethrough, and reversible spindles arranged in the openings in said blocks and with their tips screwed into said cross-bars, substantially as described.

In testimony whereof I have hereunto set my hand this 29th day of September, 1890.

HANS J. GOULDBERG.

In presence of—
  D. O. ANDERSON,
  OLE ERICKSON.